Oct. 16, 1962  G. H. FARRAH  3,058,901
ELECTROCHEMICAL DETERMINATION OF FLUORIDES
Filed April 21, 1958  2 Sheets-Sheet 2
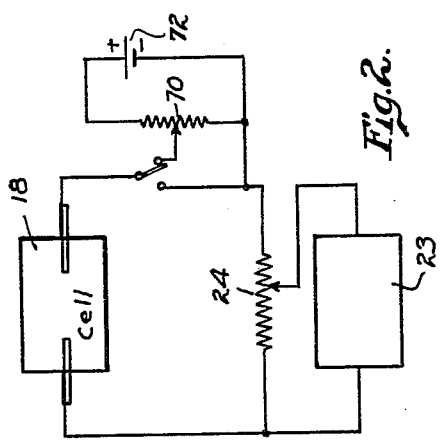
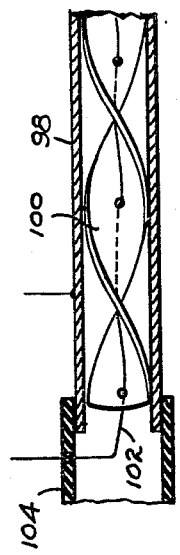
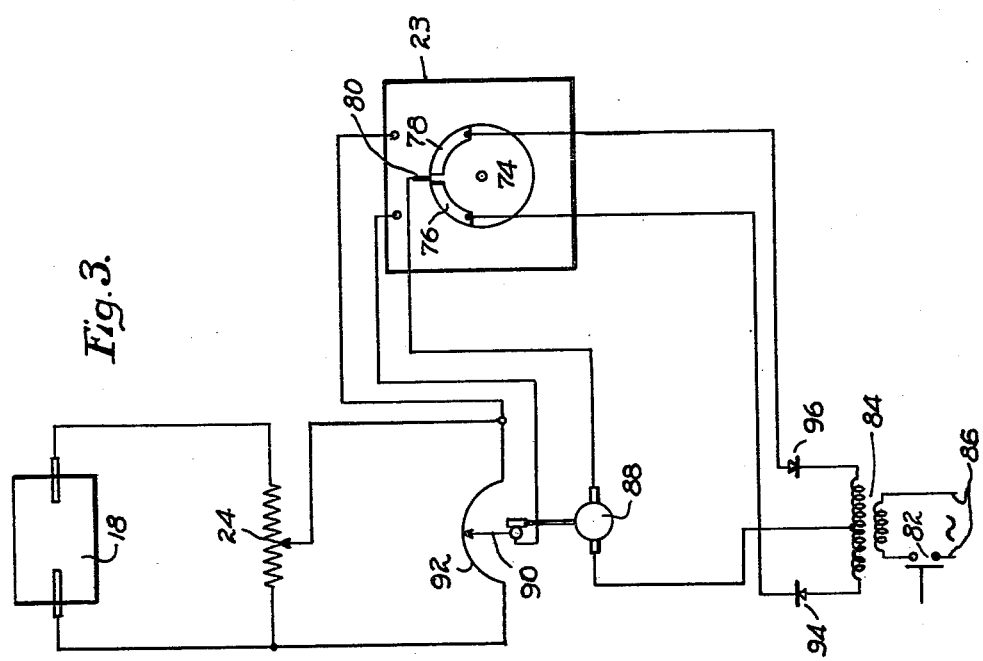
INVENTOR
George H. Farrah
BY
ATTORNEY

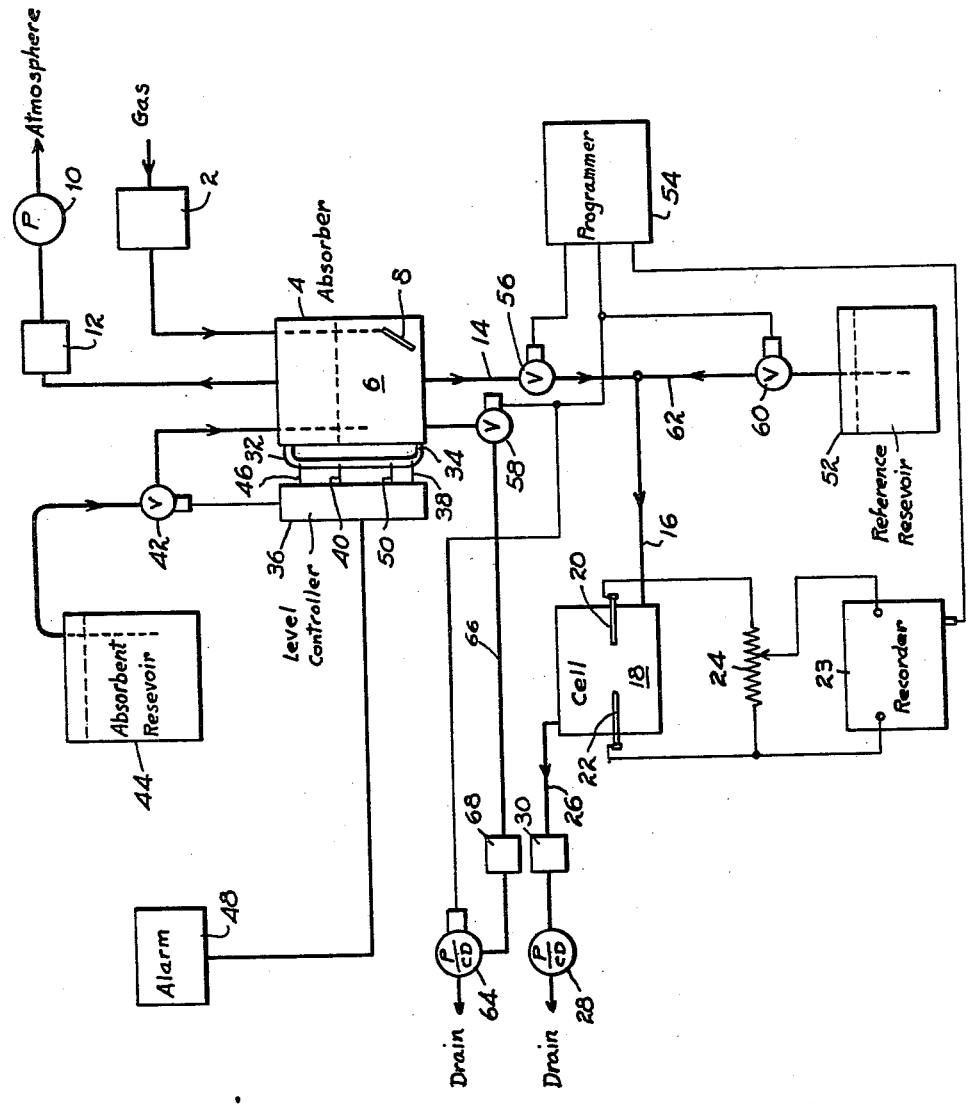

United States Patent Office 3,058,901
Patented Oct. 16, 1962

3,058,901
ELECTROCHEMICAL DETERMINATION OF FLUORIDES
George H. Farrah, New Kensington, Pa., assignor to Aluminum Company of America, Pittsburgh, Pa., a corporation of Pennsylvania
Filed Apr. 21, 1958, Ser. No. 729,844
1 Claim. (Cl. 204—195)

This invention relates to a method for the quantitative determination of fluorine, and apparatus therefor. More particularly, it is directed to a method for the continuous quantitative electrochemical determination of small quantities of fluorides in liquid and gas streams, and apparatus therefor.

Fluorine compounds are used quite extensively in industrial applications and, more recently, fluorine compounds have been added to potable water supplies to inhibit the formation of dental caries. It has become increasingly important that reliable and rapid quantitative methods for the determination of relatively small quantities of fluorine in gases and liquids be developed.

The generally accepted methods for the determination of fluorine are slow, usually requiring periods from 1½ to 6 hours. Among these are the thorium nitrate-alizarin titration and the zirconium-alizarin colorimetric tests. The various standard methods are primarily for laboratory employment and are not adapted to field use or to continuous or semi-continuous applications.

It has heretofore been proposed to determine fluoride concentrations in solutions by a method in which the solution is placed in a spontaneous electrolysis cell provided with aluminum and platinum electrodes and in which the current generated is determined after a predetermined period of time for the generated current to reach a substantially maximum value. This method is generally satisfactory, but is relatively slow and applicable only to periodic or random sampling.

It is an object of this invention to provide a method for the continuous electrochemical determination of small quantities of fluorides in liquids and gases.

A further object is to provide apparatus suitable for carrying out the above method.

Other objects and advantages will be evident from the following detailed description and the attached drawings wherein:

FIG. 1 is a diagrammatical representation of apparatus embodying the present invention and suitable for the evaluation of soluble gaseous fluorides in the atmosphere or in gas streams;

FIG. 2 is a modification of the circuit between the cell and the recorder of FIG. 1 employable with higher concentrations of fluorides;

FIG. 3 is a diagrammatic illustration of a compensating device for use with the recording device of FIG. 1.

FIG. 4 is a longitudinal sectional view of a spontaneous electrolysis cell suitable for the practice of the present invention.

It has now been discovered that small concentrations of fluorides in gas and liquid streams can be continuously electrochemically determined utilizing a spontaneous electrolysis cell provided with an aluminum anode by a method in which a fluoride-containing liquid or electrolyte representative of said gas or liquid stream is continuously passed through the spontaneous electrolysis cell thereby generating current due to electrolysis of the aluminum anode in the presence of fluoride ions, and in which the current generated by said cell is continuously measured and compared with the amount of current generated by an electrolyte of known fluoride concentration in a spontaneous electrolysis cell operating under comparable conditions.

In the determination of fluorides in an atmosphere or gas stream, at least part of the gas stream or atmosphere is continuously or semi-continuously passed through a liquid which absorbs the soluble fluoride compounds and at least part of the fluoride-containing liquid or electrolyte is continuously passed through the spontaneous electrolysis cell, the current generated by the cell being continuously measured.

In the determination of fluorides in liquid streams, at lease a representative part of the liquid stream is continuously withdrawn and passed through the spontaneous electrolysis cell, and the current generated is continuously measured.

Essential to the present invention is a continuous flow of electrolyte through the cell and the measurement of the current generated thereby. It has been found that the continuous passage of an electrolyte of a constant fluoride ion concentration through the spontaneous electrolysis cell results in the production of a definite and substantially unvarying current. By the use of this principle in the present invention, deviations in the concentration of fluoride ion are quickly determined due to more rapid response of the cell than would otherwise be experienced by use of methods employed heretofore.

The concentration of fluoride ion in the electrolyte or test liquid should be above 0.1 part per million since the current generated by lesser concentrations is somewhat erratic due to the inherent physical limitations of the system. Also fluoride concentration in the electrolyte is preferably below about 150 parts per million because of the loss of linearity in the response of the cell at increased concentrations. At amounts above about 5 parts per million, a potential of opposite polarity is desirably impressed upon the electrode from an external source to reduce the charge on the aluminum electrode and increase the linearity of response. By use of this external potential, the method can be extended to concentrations of 600 parts per million, and even higher, albeit with loss in sensitivity.

Since the spontaneous electrolysis cell requires an acidic medium, it is generally necessary that the fluoride-containing liquid or electrolyte be acidified at some point prior to the cell. In the use of the method for the determination of fluorides in gas, it has been found that the absorbent liquid may be acidified prior to being fed to the absorber without any loss in gaseous absorption efficiency. Acetic acid solutions M (0.1) are preferred although other acids such as nitric, benzoic and tartaric may also be employed, the last two albeit with some tendency to foam.

Referring to FIGURE 1, diagrammatically illustrated is a method and device for the determination of hydrogen fluoride or other soluble gaseous fluorides. A stream of gas from the atmosphere or ducts is drawn through the filter 2 wherein entrained solids are removed, and through the absorber 4 which contains a fluid or liquid 6 by which the gaseous fluoride compounds are absorbed to form the cell electrolyte, a gas dispersion device 8 generally being employed. The rate of gas flow through the absorber 4 is controlled by the pump 10 and the flowmeter 12. In the normal operation of the apparatus, absorbent liquid containing dissolved fluorides or cell electrolyte is drawn through the lines 14 and 16 and into the spontaneous electrolysis cell 18 which is provided with an aluminum electrode 20 and a substantially inert electrode 22. The current generated by the cell is translated to the recording device 23 through the range-selecting potentiometer 24. The electrolyte is constantly being drawn through the cell 18 and out the drain line 26. The rate of flow through the cell is controlled by the pump 28, which is desirably of the constant delivery type, and flowmeter 30.

To maintain a relatively uniform volume of absorbing liquid, the absorber 4 is provided with a side arm 32 which preferably has a capillary connection 34 at the lower end to prevent turbulence in the side arm. Extending into the side arm 32 are several electrodes which report the absorbent level to the level controller 36. Since the liquid 6 is electrically conductive, a circuit will be closed between the ground electrode 38 and the several electrodes in the upper side arm. When level controller electrode 40 is no longer in circuit, the level controller 36 actuates the solenoid-operated valve 42 which causes additional fluid to siphon into the absorber 4 from the fluid reservoir 44. In the event of malfunction so that a circuit is completed through the high-level electrode 46, the level controller 36 will transmit a signal to the alarm 48, which will also deenergize the apparatus. Similarly, failure to complete a circuit through the low-level electrode 50 will cause a signal to be sent to the alarm 48, and to deenergize the apparatus.

Periodically the apparatus is recalibrated against a reference solution of fluoride-containing absorbent from the reservoir 52. The programmer 54, which is conveniently a timer-operated cam, transmits signals to the various valves, closing valve 56 and opening valve 58 and at the same time opening valve 60 which will now cause reference solution from the reservoir 52 to be drawn through the lines 62 and 16 and into the spontaneous electrolysis cell 18. Simultaneously, the pump 64 is actuated and the fluoride-containing liquid or electrolyte from the absorber 4 is drawn through line 66 and flowmeter 68 to drain, thus continuing the operation of the absorber 4 in a uniform manner and preventing any unjustified increases in the fluoride content of the absorbent 6. After a period in which the reference solution has the opportunity to stabilize the current output of the spontaneous electrolysis cell 18, the programmer 54 then actuates a compensating device in the recorder 23 which will adjust the reading of the recorder to a predetermined reference point. After a time for completion of this recalibration, the programmer 54 transmits electrical impulses to the several switches causing the apparatus to return to the test or normal operation.

FIGURE 2 illustrates a modification of the circuit between the cell 18 and the recorder 23 wherein an external current may be provided through the adjustable potentiometer 70 from the direct current supply 72 so as to permit use of the cell for higher concentrations of fluorides, as will be discussed more fully.

FIGURE 3 is a schematic representation of a compensating device for the recorder 23 and which is conveniently provided within the same housing. Affixed to the shaft of the recorder 23 is a disc 74 which in turn has a pair of spaced conductive segments 76 and 78 and which are adapted to be selectively engaged by the contact 80. The programmer 54 periodically actuates the switch 82 causing current to flow through the center-tapped transformer 84 from the alternating current source 86. If the contact 80 is engaging either of the conductive segments, 76 or 78, the motor 88 will be actuated, which in turn will operate the slide arm 90 of the potentiometer 92. The direction of rotation of the motor 88 and slide arm 90 will be determined by the phase of current received, i.e., the current transmitted through the contact 80 will depend upon the segment with which it is in contact, which in turn receives its current through the rectifiers 94 and 96. The segments 76 and 78 and the contact 80 are positioned so that any deviation from the reference point on the recording device will actuate the compensating device until the reference point is regained and which, of course, coincides with the non-conductive space between the conductive segments 76 and 78. If no readjustment is required the compensating device will not be operated. After the reference solution portion of the operating cycle, the programmer 54 will open the switch 82.

Shown in FIGURE 4 is one form of electrode arrangement which may be employed for the spontaneous electrolysis cell to provide the agitation of the electrolyte which is desirable for securing adequate electrolysis of the charged aluminum electrode by insuring contact between it and the fluoride ions. Passing through the center of a high purity aluminum tube 98 is a spiral or convoluted plastic insert 100, which is a material inert to fluoride such as lucite, and which carries the inert electrode 102, generally a platinum wire. This cell arrangement may be conveniently inserted in a plastic tube of sufficient diameter and the necessary electrical contacts provided, or the necessary fluid couplings may be made to the aluminum tube itself, such as the plastic tube 104 as illustrated in FIG. 4. As electrolyte flows through the cell, the spiral center insert creates a turbulence in the flowing stream forcing fluoride ions into proximity with the tubular aluminum electrode. In a modification of this design, the spiral plastic insert and inert electrode may be replaced by an inert electrode of spiral configuration which is spaced from the aluminum tube 98 by non-conductive means.

By adjustment of the programming device and the provision of one or more additional absorbers, the method and apparatus illustrated in FIG. 1 may be converted into either a continuous sampling device or a semi-continuous sampling device. In the continuous application, the gas stream is continuously drawn through an absorber, and electrolyte or absorbent liquid containing fluorides is continuously drawn from the absorber and through the cell. In the semi-continuous sampling method, two or more absorbers are provided and gas is drawn through one absorber for a period of time to build up the concentration of fluorides, after which the gas flow is diverted to another absorber. Simultaneously, electrolyte or absorbent fluid containing fluorides is continuously being drawn from the first absorber through the cell to maintain a constant flow of electrolyte and, of course, a continuous current output to the measuring or recording device. The advantage to the semi-continuous absorbing method is that higher concentrations of fluoride in the electrolyte can be obtained from more dilute gas streams in shorter periods of time, thus more quickly enabling equilibrium current output from the cell to be reached for the indication of the magnitude of changes. On the other hand, the continuous method affords relatively instantaneous response to deviations in the fluoride content, albeit more slowly with respect to quantitative evaluation. Additionally the semi-continuous sampling method permits the use of this method with gaseous fluoride concentrations of less than about 0.1 part per million by means of the concentrating effect that can be attained.

Another modification of the method and device shown in FIG. 1 is the removal of the filter 2 so that both the entrained solid and gaseous fluorides are passed through the absorber 4, and the total soluble fluoride components thereof are then determinable by the cell 18. This application may prove undesirable where excessive quantities of insoluble solids are encountered, or where the solids contain interfering ions.

In still another modification, a pyrolyzer-hydrolyzer may be provided in the gas feed line prior to or in place of the filter 2. By use of high temperatures and/or high moisture content, and even catalysts, insoluble gaseous or solid fluorine-compounds may be pyrolyzed and/or hydrolyzed into soluble gaseous compounds, presumably hydrogen fluoride.

As is obvious to those skilled in the art, the method and apparatus diagramatically illustrated in FIGURES 1–4 can easily be adapted to use for the measurment of fluoride content in a stream of liquid such as, for example, fluoridated potable water supplies. It is only necessary that a suitable sampling of the liquid stream be brought in through the line 14 into the cell 18, a sufficient amount of acidifying agent being fed into the test stream prior to the cell.

The aluminum electrode 20 should be one of high purity metal (99.99%) which has been surface treated to insure reproducible results between electrodes since variance in surface conditions can develop considerable discrepancies. Electroetching[1] of the aluminum is preferable since it is quite easily accomplished although electropolishing[2] of the electrode has also been satisfactory.

The aluminum electrode must be replaced periodically due to its deterioration in the spontaneous electrolysis. The frequency of the substitution will be determined by the concentrations of the solutions being tested. Electroetched aluminum wire ⅛ inch in diameter has been found to give highly desirable and consistent results even after three weeks' use in electrolytes containing about 3 parts per million of fluoride.

The electrode 22 is one inert to the fluoride-containing electrolyte and is preferably of platinum, although other metals such as zirconium, gold, tungsten and titanium may be employed. Also, a saturated calomel cell may be employed by means of a salt bridge to prevent chloride contamination, although with less effectiveness.

If pulsating pumps are employed for drawing the electrolyte through the cell, surge tanks should be inserted in the lines 26 and 66. The entire apparatus is desirably encased in a temperature controlled enclosure to prevent variations due to changes in temperature. Otherwise it is desirable to employ devices for determining the temperature of the electrolyte.

The operation of the cell is presumably due to the spontaneous electrolysis of the aluminum electrode in the presence of the fluoride-containing electrolyte. The reaction at the aluminum electrode is probably as follows:

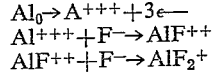

and perhaps even

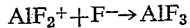

Thus it can be seen that the concentration of fluoride ion will determine the amount of aluminum going into solution. However, as higher concentrations of fluoride ion are approached, i.e., greater than about 5 parts per million, the charge on aluminum electrode apparently becomes large and tends to repel the fluoride ions as indicated by the lessening of the slope on a plot of concentration vs. current, although the cell is still employable at concentrations of up to 300 parts per million. The linearity of the current response in these higher concentrations can be greatly improved by applying to the aluminum electrode a potential of opposite polarity from an external source which will reduce the charge upon the aluminum electrode; in this manner, the range of electrolyte concentrations can also be extended up to about 600 parts per million. FIGURE 2 discloses a modification of the apparatus to provide this external potential, and the application of this potential may conveniently be effected through a circuit controlled by the measuring device. Relatively uniform agitation of the fluoride-containing electrolyte is also desirable for reproducible results.

Certain ions have been found to interfere with or reduce the efficacy of the invention. The chloride ion has been found particularly objectionable and aluminum ions have also hampered operation of the cell. Large quantities of phosphate and sulfate ions (on the order of 100 times the fluoride concentration) have also been detrimental. For this reason, it is desirable that distilled or deionized water be employed in the absorbers to prevent introduction of foreign ions.

The cell absorber and fluid-transporting tubes and containers are preferably of a material inert to fluoride ions, such as tygon, lucite or other plastics. "Sigma" or "peristaltic" pumps may be employed, or standard pumps may be provided with inert fluid-bearing surfaces.

EXAMPLE 1

A device substantially as illustrated in FIG. 1 was employed for the determination of gaseous fluoride contained in an industrial atmosphere. The spontaneous electrolysis cell was provided with electroetched aluminum wire electrode ⅛ inch in diameter and a platinum inert electrode of 20 gauge wire. A representative sampling of an industrial atmosphere was passed through a filter and continuously conducted through the absorber, which employed a 0.1 molar acetic acid solution (distilled water), at a rate of 0.4 cubic foot per minute. Electrolyte was drawn from the absorber and continuously passed through the spontaneous electrolysis cell at the rate of 15 milliliters per minute. The current generated was measured and recorded on a Leeds & Northrup recorder. An operating cycle as governed by the programmer included a sampling period of 100 minutes after which the reference solution (containing 1 part per million of fluoride ion) was continuously passed through the cell for 20 minutes, the compensating device of the recorder being energized for the last 5 minutes of the reference solution flow. The temperature was maintained at about 28° C.

Table 1 indicates the fluoride content at intervals as determined by the method and apparatus of the present invention and as compared to the far-more time consuming chemical determinations made of samples taken at the same time. The chemical analysis employed was the thorium nitrate-alizarin titration method.

*Table 1*

[Gaseous fluoride content, mg./ft.³]

| Spontaneous Electrolysis Cell | Th (NO₃)₄ Titration |
|---|---|
| 0.010 | 0.008 |
| 0.007 | 0.006 |
| 0.008 | 0.012 |
| 0.011 | 0.010 |

EXAMPLE 2

The semi-continuous or batch method of absorbing was employed, the gas and liquid throughput rates being substantially the same. The aluminum electrode was an electropolished ⅛ inch wire. The gas being tested was a representative sampling of that in the ducts conducting waste fumes from electrolytic cells for the production of aluminum in a molten fluorides bath.

*Table 2*

[Gaseous fluoride content, mg./ft.³]

| Spontaneous Electrolysis Cell | Th (NO₃)₄ Titration |
|---|---|
| 0.24 | 0.20 |
| 0.59 | 0.56 |
| 0.63 | 0.54 |
| 1.28 | 1.17 |
| 1.29 | 1.23 |
| 1.35 | 1.33 |
| 1.65 | 1.55 |
| 1.55 | 1.35 |

It is evident from the above examples that the present invention provides a highly desirable method for the

---

[1] See, for example, the method employed in "The Aluminum Indicator Electrode in Acid-Base Potentiometric Titrations," Elio Scarano, Anal. Chem. Acta, vol. 16, p. 365 (1957).
[2] Exemplary of electropolishing methods is the brightening step disclosed in British Patent 558,925 (1944).

analysis of fluoride, especially small quantities thereof. The procedure is rapid and possesses a very high degree of accuracy, especially when the inherent problems of chemical determinations are considered. By this invention, rapid and accurate evaluation of fluoride content can be made and a permanent record maintained. It is also equally feasible to employ this method and apparatus to control the rates of addition of either fluorides per se or reactants for the removal of fluorides.

Having thus described the invention, I claim:

Apparatus for electrochemical determination of fluorides in a gas comprising a spontaneous electrolysis cell provided with an aluminum electrode and a substantially inert electrode; an absorber containing a liquid for absorbing said fluorides; means for passing a stream of said gas through the said liquid in said absorber for dissolving said fluorides to produce an electrolyte; means for conducting at least a part of said fluoride-containing electrolyte from the said absorber through said cell continuously and at a predetermined rate whereby a current is spontaneously generated by said cell; means for measuring the amount of current generated by said cell; a reservoir containing a reference solution of fluoride-containing electrolyte; means for conducting reference solution from said reservoir through said cell continuously and at the aforesaid predetermined rate; and means for periodically terminating temporarily the flow of electrolyte from said absorber through said cell and for actuating the flow of said reference solution through said cell while the flow of electrolyte through the said cell is so terminated so that a continuous flow of liquid through said cell is maintained, the current flow generated by said reference solution being determined by the aforesaid measuring means.

References Cited in the file of this patent

UNITED STATES PATENTS

| | | |
|---|---|---|
| 2,651,612 | Haller | Sept. 8, 1953 |
| 2,805,191 | Hersch | Sept. 3, 1957 |
| 2,870,067 | Baker et al. | Jan. 20, 1959 |

FOREIGN PATENTS

| | | |
|---|---|---|
| 81,243 | Netherlands | Apr. 16, 1956 |
| 374,806 | Great Britain | June 16, 1932 |

OTHER REFERENCES

Analytical Chem., vol. 27, pages 1306 and 1307, August 1955, article by Baker et al.